(12) United States Patent
Okada et al.

(10) Patent No.: US 6,976,356 B2
(45) Date of Patent: Dec. 20, 2005

(54) EXHAUST GAS PURIFIER FOR USE IN INTERNAL COMBUSTION ENGINE

(75) Inventors: Kojiro Okada, Tokyo (JP); Osamu Nakayama, Tokyo (JP); Yasuki Tamura, Tokyo (JP); Kazuhito Kawashima, Tokyo (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/768,142

(22) Filed: Feb. 2, 2004

(65) Prior Publication Data

US 2004/0154288 A1    Aug. 12, 2004

Related U.S. Application Data

(62) Division of application No. 09/646,689, filed as application No. PCT/JP99/05097 on Sep. 20, 1999, now Pat. No. 6,718,756.

(30) Foreign Application Priority Data

Jan. 21, 1999 (JP) ................................. 11-12601

(51) Int. Cl.[7] ................................................. F01N 3/00
(52) U.S. Cl. ............................ 60/286; 60/276; 60/285; 60/277
(58) Field of Search .................... 60/274, 276, 285, 60/286, 295, 301, 303, 277

(56) References Cited

U.S. PATENT DOCUMENTS

| | | |
|---|---|---|
| 5,201,802 A | 4/1993 | Hirota et al. |
| 5,251,605 A | 10/1993 | Swailes |
| 5,577,382 A | 11/1996 | Kihara et al. |
| 5,693,877 A | 12/1997 | Ohsuga et al. |
| 5,715,679 A | 2/1998 | Asanuma et al. |
| 5,735,120 A | 4/1998 | Nagai |
| 5,839,275 A | 11/1998 | Hirota et al. |
| 5,956,942 A | 9/1999 | Sebastiano et al. |
| 6,016,653 A | 1/2000 | Glassey et al. |
| 6,041,591 A | 3/2000 | Kaneko et al. |
| 6,058,700 A | 5/2000 | Yamashita et al. |
| 6,101,809 A | 8/2000 | Ishizuka et al. |
| 6,148,612 A | 11/2000 | Yamashita et al. |
| 6,178,743 B1 | 1/2001 | Hirota et al. |
| 6,185,929 B1 | 2/2001 | Ishizuka et al. |
| 6,199,372 B1 | 3/2001 | Wakamoto |
| 6,269,634 B1 * | 8/2001 | Yokota et al. ................ 60/286 |
| 6,289,672 B1 | 9/2001 | Katoh et al. |
| 6,336,320 B1 | 1/2002 | Tanaka et al. |
| 6,477,833 B2 * | 11/2002 | Tayama et al. ............... 60/285 |

(Continued)

FOREIGN PATENT DOCUMENTS

EP            0733786 A2    9/1996

(Continued)

Primary Examiner—Tu M. Nguyen
(74) Attorney, Agent, or Firm—Birch, Stewart, Kolasch & Birch, LLP

(57) ABSTRACT

When a NOx-releasing unit is operated to change an air-fuel ratio to a rich side to thereby establish a low-oxygen-concentration atmosphere of an exhaust gas such that NOx is released from a NOx catalyst, a reducer-supplying unit additionally supplies a reducer during an operating period of the NOx-releasing unit for reducing NOx released into an exhaust path such that release of NOx balances with reduction of NOx, thereby reducing NOx released from the NOx catalyst and thus suppressing worsening of an exhaust gas performance.

11 Claims, 12 Drawing Sheets

U.S. PATENT DOCUMENTS

| | | | |
|---|---|---|---|
| 6,477,834 B1 * | 11/2002 | Asanuma et al. | 60/295 |
| 6,519,932 B2 * | 2/2003 | Ohuchi et al. | 60/285 |
| 6,519,934 B2 * | 2/2003 | Mashiki | 60/285 |
| 6,672,053 B2 * | 1/2004 | Bidner et al. | 60/285 |
| 2001/0054284 A1 | 12/2001 | Mashiki | |
| 2002/0053200 A1 | 5/2002 | Ohuchi et al. | |

FOREIGN PATENT DOCUMENTS

| | | |
|---|---|---|
| EP | 0839996 A2 | 5/1998 |
| EP | 0849441 A1 | 6/1998 |
| JP | 4-231645 A | 8/1992 |
| JP | 6-117231 A | 4/1994 |
| JP | 6-129239 A | 5/1994 |
| JP | 2845056 B2 | 5/1994 |
| JP | 6-307232 A | 11/1994 |
| JP | 2780596 B2 | 11/1994 |
| JP | 7-97917 A | 4/1995 |
| JP | 7-166851 A | 6/1995 |
| JP | 7-166913 A1 | 6/1995 |
| JP | 8-254135 A | 10/1996 |
| JP | 10-311235 A | 11/1998 |
| JP | 2000-27677 A | 1/2000 |
| JP | 2000-38942 A | 2/2000 |
| WO | WO 94/17291 A1 | 8/1994 |
| WO | WO 96/22457 A1 | 7/1996 |

* cited by examiner

EXHAUST GAS PURIFIER FOR USE IN INTERNAL COMBUSTION ENGINE

CROSS REFERENCE TO RELATED APPLICATIONS

This application is a Divisional of application Ser. No. 09/646,689 filed on Sep. 21, 2000 now U.S. Pat. No. 6,718,756 and for which priority is claimed under 35 U.S.C. § 120. application Ser. No. 09/646,689 is the national phase of PCT International Application No. PCT/JP99/05097 filed on Sep. 20, 1999 under 35 U.S.C. § 371. This application also claims priority of Application No. 11-12601 filed in Japan on Jan. 21, 1999 under 35 U.S.C. § 119. The entire contents of each of the above-identified applications are hereby incorporated by reference.

BACKGROUND OF THE INVENTION

1. Field of the Invention

The present invention relates to an exhaust gas purifier for use in an internal combustion engine having, in an exhaust gas passage thereof, a catalyst device (NOx catalyst) which occludes NOx contained in the exhaust gas at a lean air-fuel ratio; i.e., in an oxygen-excessive atmosphere, and which releases occluded NOx at a stoichiometric air-fuel ratio or a rich air-fuel ratio; i.e., in a low-oxygen-concentration atmosphere.

2. Description of the Related Art

Recently, in order to improve fuel economy, a lean-burn engine enabling combustion at a lean air-fuel ratio has been put into practical use. The lean-burn engine has a problem in that a conventional three-way catalytic converter cannot sufficiently purify NOx in an exhaust gas during a lean combustion due to its purification characteristics. Thus, recently there has been employed, for example, a catalyst device (NOx catalyst) for purifying NOx in the exhaust gas during the lean combustion through occlusion of NOx contained in the exhaust gas.

The NOx catalyst is known to purify NOx contained in exhaust gas in an oxygen-excessive atmosphere (at a lean air-fuel ratio) through occlusion of NOx onto a catalyst and to release the occluded NOx when an oxygen concentration lowers (at a stoichiometric air-fuel ratio or a rich air-fuel ratio). Specifically, in the oxygen-excessive atmosphere, the NOx catalyst produces a nitrate from NOx contained in exhaust to thereby occlude NOx. By contrast, in a low-oxygen-concentration atmosphere, the NOx catalyst causes the nitrate occluded on the NOx catalyst and CO contained in the exhaust gas to react with each other, thereby generating a carbonate and releasing NOx.

In the oxygen-excessive atmosphere during a lean operation, the NOx catalyst occludes NOx thereon. However, when the NOx catalyst becomes saturated with occluded NOx after continuation of the lean operation, most NOx contained in the exhaust gas is emitted into the atmosphere. Thus, before the NOx catalyst becomes saturated with NOx, the air-fuel ratio is switched to a stoichiometric air-fuel ratio or a rich air-fuel ratio to lower the oxygen concentration of the exhaust gas, whereby NOx is released and reduced to thereby restore the NOx occlusion capability of the NOx catalyst. According to a technique disclosed in, for example, Japanese Patent Application Laid-Open (kokai) No. 7-166913, when the air-fuel ratio of the engine is switched to a stoichiometric air-fuel ratio or a rich air-fuel ratio in order to restore the NOx occlusion capability of the NOx catalyst, the air-fuel ratio is gradually changed to a stoichiometric air-fuel ratio or a rich air-fuel ratio to thereby release and reduce NOx while suppressing a torque shock acting on the engine.

When NOx is released and reduced through switching the air-fuel ratio of the engine to the stoichiometric air-fuel ratio or the rich air-fuel ratio (CO is generated and supplied into the exhaust gas; i.e., to the NOx catalyst) in order to restore the NOx occlusion capability of the NOx catalyst, a portion of the supplied CO is consumed for releasing the occluded NOx, and a residual CO is consumed for reducing released NOx. When a ratio, at which NOx is reduced by means of reducers, such as the residual CO and HC, coincides with that at which NOx is released, release of NOx and CO into the atmosphere can be suppressed.

However, the technique disclosed in the above publication encounters a difficulty in establishing coincidence between a ratio at which NOx is reduced and that at which NOx is released. This is because the NOx occlusion capability restoration performance of the NOx catalyst; i.e., the releasability of the NOx catalyst with respect to the occluded NOx (NOx-releasing rate), depends on the form and amount of a catalytic component carried by the NOx catalyst.

In the case of employment of a NOx catalyst having improved NOx occlusion capability restoration performance, the NOx-releasing rate, or the rate at which NOx is released from the NOx catalyst, is also improved. As a result, the amount of NOx present in the exhaust gas and to be reduced by means of reducers tends to become smaller than that of NOx to be released (NOx to be reduced<NOx to be released). Thus, residual NOx which remains in the exhaust gas without being reduced is emitted into the atmosphere. By contrast, in the case of employment of an NOx catalyst having a limited NOx occlusion capability restoration performance, the amount of NOx to be reduced tends to become greater than that of NOx to be released (NOx to be reduced>NOx to be released). Thus, reducers (CO, etc.) remain in the exhaust gas and are released into the atmosphere.

Generally, as the air-fuel ratio of the engine approaches the rich side (as the amount of CO increases), the NOx-releasing rate increases. Thus, when the air-fuel ratio is shifted toward the stoichiometric air-fuel ratio or the rich air-fuel ratio as described in the above publication, the NOx-releasing rate begins to increase at a near stoichiometric air-fuel ratio, at which the amount of CO begins to increase; thus, the amount of NOx to be released from the NOx catalyst increases. However, the amount of reducers (residual CO, HC, etc. which have not contributed to release of NOx) is not sufficient for reducing the increased amount of released NOx. As a result, the released NOx, remaining in the exhaust gas, is released into the atmosphere without being reduced.

A conceivable solution to this problem is to increase the amount of reducers by enriching the air-fuel ratio of the engine. In this case, since the amount of CO serving as a reducer also increases, the amount of NOx to be released increases. Therefore, in actuality, the above-mentioned "NOx to be reduced<NOx to be released" relation remains unchanged. As a result, the residual NOx, which remains in the exhaust gas without being reduced is released into the atmosphere, constituting failure to suppress emission of NOx.

Accordingly, the technique disclosed in the above publication encounters a difficulty in establishing substantial coincidence between the amount of NOx to be reduced and that of NOx to be released and thus involves a problem in that exhaust gas characteristics are impaired during release of NOx from the catalyst and reduction of released NOx.

The present invention has been accomplished in view of the foregoing, and an object of the present invention is to provide an exhaust purifier for use in an internal combustion engine capable of reliably reducing NOx released from a catalyst device (NOx catalyst).

SUMMARY OF THE INVENTION

According to an exhaust purifier of the present invention for use in an internal combustion engine, when the exhaust air-fuel ratio of the engine is switched from a lean air-fuel ratio to a stoichiometric air-fuel ratio or a rich air-fuel ratio, reducer-supplying means supplies a reducer for reducing NOx released from an NOx catalyst device to reduce NOx released from the catalyst device without impairing exhaust gas characteristics.

Since NOx released from the NOx catalyst device is reduced by means of the supplied reducer, NOx is not released into the atmosphere, thereby suppressing impairment in the exhaust gas performance.

In the case of a cylinder-injection-type internal combustion engine having an injection valve for directly injecting fuel into a combustion chamber, the reducer-supplying means preferably injects fuel during an expansion stroke or an exhaust stroke subsequent to a main injection effected by the injection valve (injection during an intake stroke or injection during a compression stroke).

Thus, NOx released from the catalyst device can be reliably reduced without need of a complicated device.

According to the exhaust purifier of the present invention for use in an internal combustion engine, when NOx-releasing means is operated to create a low-oxygen-concentration exhaust atmosphere in order to release NOx from a NOx catalyst, the reducer-supplying means additionally supplies a reducer for reducing NOx released into an exhaust path, at a predetermined timing during operation of the NOx-releasing means, thereby reducing NOx released from the NOx catalyst without impairment of the exhaust gas characteristics.

Since NOx released from the catalyst device is reduced by means of the supplied reducer, NOx is not released into the atmosphere, thereby suppressing impairment in the exhaust gas performance.

Particularly, a preferred reducer to be supplied by the reducer-supplying means is mainly composed of, for example, HC, which does not increase the NOx releasing rate abruptly. Thus, in the case of, for example, a cylinder-injection-type internal combustion engine, the reducer-supplying means preferably assumes the form of fuel control for injecting additional fuel during an expansion stroke or an exhaust stroke subsequent to main injection (injection during an intake stroke or injection during a compression stroke) or assumes the form of an injection valve dedicated to injection of a reducer and adapted to inject fuel into an exhaust gas passage.

The NOx catalyst occludes NOx contained in the exhaust gas when the exhaust gas assumes a lean air-fuel ratio; i.e., the form of an oxygen-excessive atmosphere. The NOx catalyst releases occluded NOx when the exhaust gas assumes a stoichiometric air-fuel ratio or a rich air-fuel ratio; i.e., the form of a low-oxygen-concentration atmosphere. The reducer-supplying means operates at a predetermined period of time when the exhaust gas assumes a near stoichiometric air-fuel ratio as a result of operation of the NOx-releasing means. In the case of an engine having an injection valve for injecting fuel directly into a combustion chamber, the reducer-supplying means controls operation of the injection valve to additionally supply a reducer.

The NOx-releasing means has a regenerative function for establishing a rich air-fuel ratio in the exhaust gas for a first predetermined period of time and subsequently establishing a near stoichiometric air-fuel ratio for a second predetermined period of time when NOx occluded on the NOx catalyst is to be released. The reducer-supplying means operates when the NOx-releasing means causes switching of an air-fuel ratio in the exhaust gas to a rich air-fuel ratio. The exhaust purifier includes deterioration-detecting means for detecting the degree of deterioration of the NOx catalyst, and correction means for making correction to prolong the second predetermined period of time associated with the regenerative function of the NOx-releasing means or to shorten the operating period of time of the reducer-supplying means as the degree of deterioration of the NOx catalyst detected by the deterioration-detecting means increases.

DETAILED DESCRIPTION OF THE PRESENT INVENTION

Embodiments of the present invention will next be described in detail with reference to the drawings.

A cylinder-injection-type straight 4-cylinder gasoline engine (cylinder-injection engine) 1 will be described as an example of a multiple-cylinder cylinder-injection-type internal combustion engine. In the cylinder-injection engine 1, fuel injection during an intake stroke (intake-stroke injection mode) or fuel injection during a compression stroke (compression-stroke injection mode) can be performed through, for example, switching of combustion modes (operation modes). The cylinder-injection engine 1 enables operation at a stoichiometric air-fuel ratio (stoichiometry), operation at a rich air-fuel ratio (rich-air-fuel-ratio operation), and operation at a lean air-fuel ratio (lean-air-fuel-ratio operation).

Particularly, in the compression-stroke injection mode, the cylinder-injection engine 1 can be operated at an ultra-lean air-fuel ratio, which is greater than the air-fuel ratio of a lean-air-fuel-ratio operation performed during an intake stroke.

Figure 1:
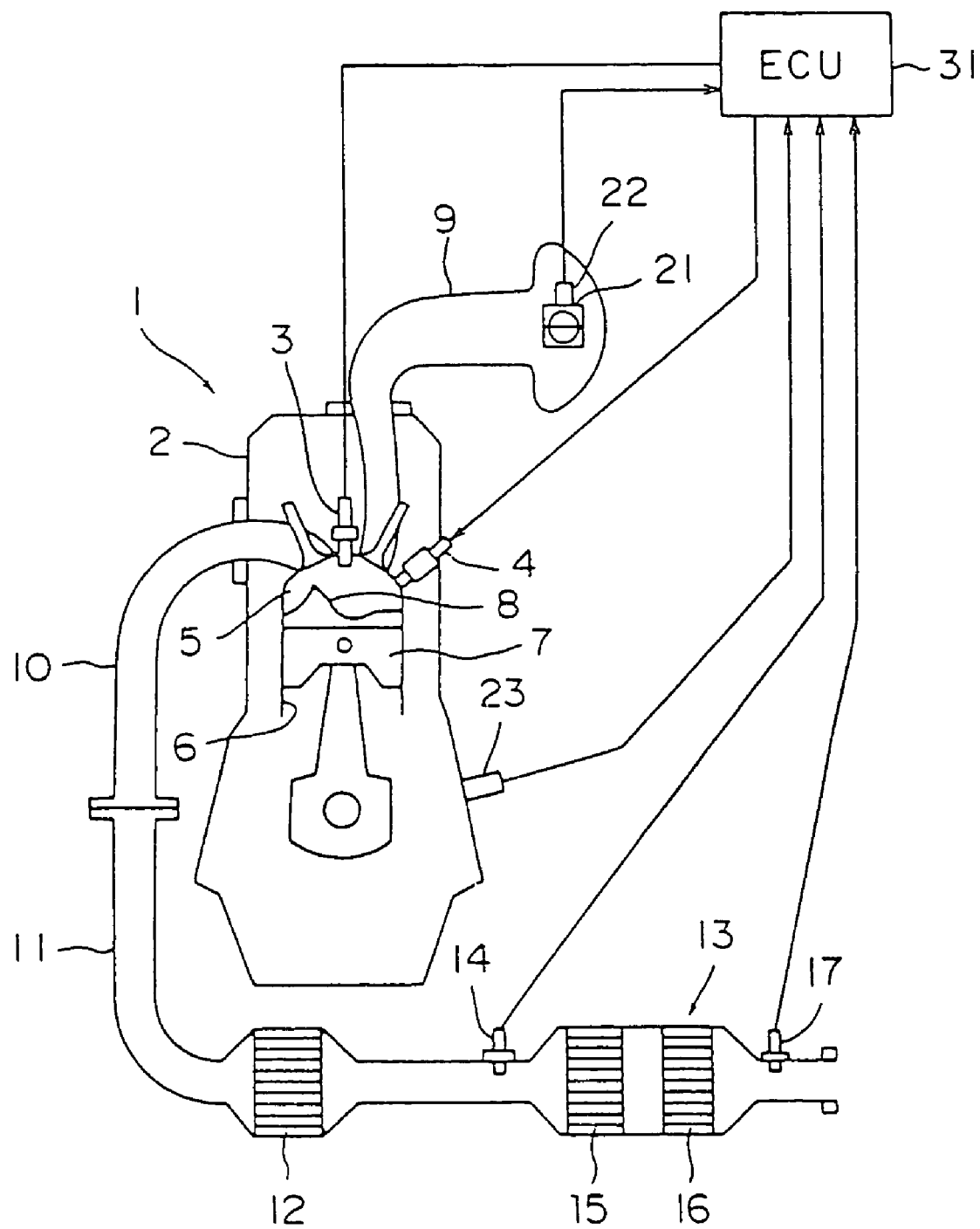
FIG. 1 is a schematic view of an internal combustion engine having an exhaust purifier according to an embodiment of the present invention.

As shown in FIG. 1, a cylinder head 2 of the cylinder-injection engine 1 includes spark plugs 3 mounted thereon for individual cylinders and solenoid-type fuel injection valves 4 mounted thereon for individual cylinders. An injection port of the fuel injection valve 4 opens into a combustion chamber 5 so that fuel is injected directly into the combustion chamber 5 from the fuel injection valve 4. A piston 7 is supported in a cylinder 6 of the cylinder-injection engine 1 in a vertically slidable manner. A hemispherically depressed cavity 8 is formed on the top surface of the piston 7. The cavity 8 is adapted to generate a reverse tumble flow, which is directed clockwise in FIG. 1.

The cylinder head 2 has intake ports formed therein in substantially vertical direction for individual cylinders. The corresponding ends of an intake manifold 9 are connected to the intake ports in a communicating manner. The cylinder head 2 has exhaust ports formed therein in a substantially horizontal direction for individual cylinders. The corresponding ends of an exhaust manifold 10 are connected to the exhaust ports in a communicating manner. An unillustrated EGR device is disposed in the exhaust manifold 10.

An exhaust pipe (exhaust gas passage) 11 is connected to the exhaust manifold 10 of the engine 1. An unillustrated muffler is connected to the exhaust pipe 11 via a small-sized three-way catalyst 12 located in the vicinity of the engine 1, and via an exhaust-purifying catalyst device 13. A high-temperature sensor 14 for detecting exhaust temperature is disposed in the exhaust pipe 11 at a portion between the three-way catalyst 12 and the exhaust-purifying catalyst device 13 and immediately upstream of the exhaust-purifying catalyst device 13; i.e., immediately upstream of an NOx catalyst 15, which will be described later.

The exhaust-purifying catalyst device 13 includes the NOx catalyst 15 (catalyst device) and a three-way catalyst 16. When an exhaust gas assumes a lean air-fuel ratio; i.e., the form of an oxygen-excessive atmosphere, the NOx catalyst 15 purifies NOx contained in the exhaust gas through occlusion of NOx onto the catalyst. When the oxygen concentration of the exhaust gas lowers until the exhaust gas assumes a stoichiometric air-fuel ratio or a rich air-fuel ratio, the NOx catalyst 15 releases the occluded NOx. The three-way catalyst 16 has a three-way function capable of purifying CO, HC, and NOx gases in an atmosphere having a stoichiometric air-fuel ratio. The three-way catalyst 16 is disposed downstream of the NOx catalyst 15 and is adapted to reduce a portion of NOx released from the NOx catalyst 15 which remains unreduced. Notably, the structure of the exhaust-purifying catalyst device 13 is not limited to that of the above-described embodiment in terms of arrangement and function of the catalyst, insofar as the exhaust-purifying catalyst device 13 includes at least one NOx catalyst 15.

The NOx catalyst 15 has the NOx release-and-reduction function of once occluding NOx in an oxidizing atmosphere and releasing NOx and reducing the same to $N_2$ (nitrogen) in a reducing atmosphere in which a predominant amount of CO is present. Specifically, the NOx catalyst 15 includes noble metals, such as platinum (Pt) and palladium (Pd), serving as catalysts, and alkali metals, such as barium (Ba), and alkaline-earth metal, serving as occludent substances. A NOx sensor 17 for detecting the NOx concentration of the exhaust gas is disposed downstream of the exhaust-purifying catalyst device 13.

An electric throttle valve 21 of a drive-by-wire (DBW) type is connected to the intake manifold 9. A throttle position sensor 22 for detecting a throttle opening θth is disposed on the throttle valve 21. A crank angle sensor 23 for detecting a crank angle is disposed on the engine 1. The crank angle sensor 23 can detect engine speed Ne.

A vehicle is equipped with an electronic control unit (ECU) 31. The ECU 31 includes an input-output unit; a storage unit for storing a control program, a control map, etc.; a central processing unit; a timer; and counters. The ECU 31 performs overall control of the exhaust purifier of the present embodiment as well as overall control of the cylinder-injection engine 1. Information detected by various sensors is input to the ECU 31. On the basis of the input information, the ECU 31 determines a fuel injection mode, the amount of fuel to be injected, and ignition timing, and operates and controls the fuel injection valves 4, the spark plugs 3, etc.

In the cylinder-injection engine 1, intake air which flows into the combustion chamber 5 from the intake manifold 9 forms a reverse tumble flow. Fuel is injected at or after a middle point of a compression stroke, and a small amount of fuel is collected only in the vicinity of the spark plug 3, which is disposed at the center of a top portion of the combustion chamber 5, through utilization of the reverse tumble flow. Thus, a very lean air-fuel ratio is established at a portion of the combustion chamber 5 located away from the spark plug 3. Through establishment of a stoichiometric air-fuel ratio or a rich air-fuel ratio only in the vicinity of the spark plug 3, a stable stratified-charge combustion (stratified-charge ultralean combustion) is established to thereby reduce fuel consumption.

When obtaining a high output from the cylinder-injection engine 1, fuel is injected from the fuel injection valve 4 during an intake stroke to homogenize the mixture within the entire combustion chamber 5 to a stoichiometric air-fuel ratio or a lean air-fuel ratio, followed by a pre-mixture combustion. In this case, since a higher output is obtained at a stoichiometric air-fuel ratio or a rich air-fuel ratio, fuel is injected at such timing that fuel is atomized or vaporized sufficiently, thereby yielding high output efficiently.

On the basis of throttle opening θth received from the throttle position sensor 22 and engine speed Ne received from the crank angle sensor 23, the ECU 31 obtains a target cylinder pressure corresponding to an engine load; i.e., target mean effective pressure Pe. Further, through reference to a map (not shown) with respect to the thus-obtained target mean effective pressure Pe and engine speed Ne, the ECU 31 determines a fuel injection mode. For example, when target mean effective pressure Pe and engine speed Ne are both low, the compression-stroke injection mode is selected as a fuel injection mode, so that fuel is injected during a compression stroke. When the target mean effective pressure Pe or engine speed Ne increases, the intake-stroke injection mode is selected as a fuel injection mode, so that fuel is injected during an intake stroke. On the basis of the target mean effective pressure Pe and engine speed Ne, a target air-fuel ratio (target A/F) is set so as to serve as a target of control for the corresponding fuel injection mode. On the basis of this target A/F, an appropriate amount of fuel to be injected is determined.

As in the case of an ultralean combustion operation in a lean mode, when exhaust gas assumes a lean air-fuel ratio; i.e., the form of an oxygen-excessive atmosphere, the NOx catalyst 15 of the exhaust-purifying catalyst device 13 occludes NOx contained in exhaust, in the form of a nitrate to thereby purify exhaust. When the oxygen concentration of exhaust gas lowers until the exhaust gas assumes a stoichiometric air-fuel ratio or a rich air-fuel ratio, a nitrate occluded on the NOx catalyst 15 and CO contained in the exhaust gas react to produce a carbonate, thereby releasing NOx from the NOx catalyst 15. Accordingly, as occlusion of NOx onto the NOx catalyst 15 progresses, the oxygen concentration of the exhaust gas is decreased through a shift of the air-fuel ratio toward the rich side or through injection of additional fuel to supply CO, thereby releasing and reducing NOx occluded on the NOx catalyst 15 and thus maintaining the NOx-occluding function of the NOx catalyst 15.

Figure 2:
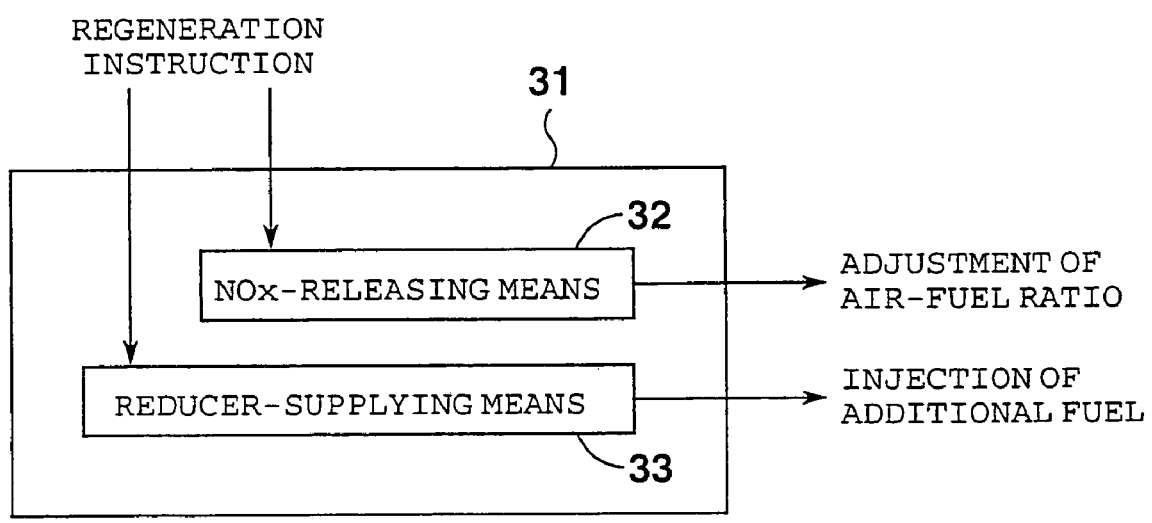
FIG. 2 is a block diagram of the exhaust purifier.

As shown in FIG. 2, the 31 includes NOx-releasing means 32 for releasing NOx from the NOx catalyst 15 through lowering of the oxygen concentration of exhaust (establishment of a low-oxygen-concentration atmosphere of the exhaust gas). The NOx-releasing means 32 causes the occluded NOx to be released from the NOx catalyst 15 and reduced (NOx purge) in response to an instruction to release NOx from the NOx catalyst 15 (regeneration instruction). The NOx-releasing means 32 has a regeneration function composed of a rich purge function and a stoichiometric feedback (S-F/B) purge function. In execution of the NOx purge, the rich purge function establishes a rich air-fuel ratio in the exhaust gas for a first predetermined period of time, and subsequently the stoichiometric feedback purge function establishes a near stoichiometric air-fuel ratio (a stoichiometric air-fuel ratio or an air-fuel ratio slightly richer than the stoichiometric air-fuel ratio) for a second predetermined period of time.

The ECU 31 includes reducer-supplying means 33, which assumes the form of a pulse injection means. In order to additionally supply a reducer for reducing the released NOx, the reducer-supplying means 33 causes additional fuel to be injected during the latter stage of an expansion stroke (or during the initial stage of an exhaust stroke) at a predetermined point of time (upon elapse of a predetermined period of time after a near stoichiometric air-fuel ratio is reached as a result of control of the air-fuel ratio to a rich air-fuel ratio; i.e., when the air-fuel ratio of the exhaust gas is switched to a rich air-fuel ratio) during release of NOx effected by the NOx-releasing means 32.

At a predetermined point of time during release of NOx effected by the NOx-releasing means 32, the pulse injection means operates to effect injection of additional fuel during the latter stage of an expansion stroke (or during the initial stage of an exhaust stroke). However, the pulse injection means may be operated, irrelevant to the operation of the NOx-releasing means 32, when the air-fuel ratio of the engine is switched to a stoichiometric air-fuel ratio or a rich air-fuel ratio. Specifically, upon an increase in load, such as upon acceleration or upon operation of an air conditioner or power steering, or when the air-fuel ratio of the engine is switched to a stoichiometric air-fuel ratio or a rich air-fuel ratio upon establishment of a negative pressure for a brake master vac., NOx is naturally released without operation of the NOx-releasing means 32. In this case, the pulse injection means may be operated during the latter stage of an expansion stroke (or during the initial stage of an exhaust stroke) to inject additional fuel.

Basic operation of the above-described exhaust purifier will be described with reference to FIG. 3.

As in the case of an ultralean combustion operation in a lean mode, when an exhaust gas assumes a lean air-fuel ratio; i.e., the form of an oxygen-excessive atmosphere, the NOx catalyst 15 of the exhaust-purifying catalyst device 13 causes oxidation of NOx contained in the exhaust gas, thereby producing a nitrate, whereby NOx is occluded to purify the exhaust gas. When the oxygen concentration of the exhaust gas lowers until the exhaust gas assumes a stoichiometric air-fuel ratio or a rich air-fuel ratio, a nitrate occluded on the NOx catalyst 15 and CO contained in the exhaust gas react to produce a carbonate, thereby releasing NOx from the NOx catalyst 15. Accordingly, as occlusion of NOx onto the NOx catalyst 15 progresses; for example, when the cumulative time of lean operation exceeds a predetermined period of time, a regeneration instruction is sent to the NOx-releasing means 32. The NOx-releasing means 32 controls the air-fuel ratio to a stoichiometric air-fuel ratio or a rich air-fuel ratio to lower the oxygen concentration of the exhaust gas, thereby causing release of NOx from the NOx catalyst 15 for maintaining the function of the NOx catalyst 15 (regeneration operation).

Figure 3:
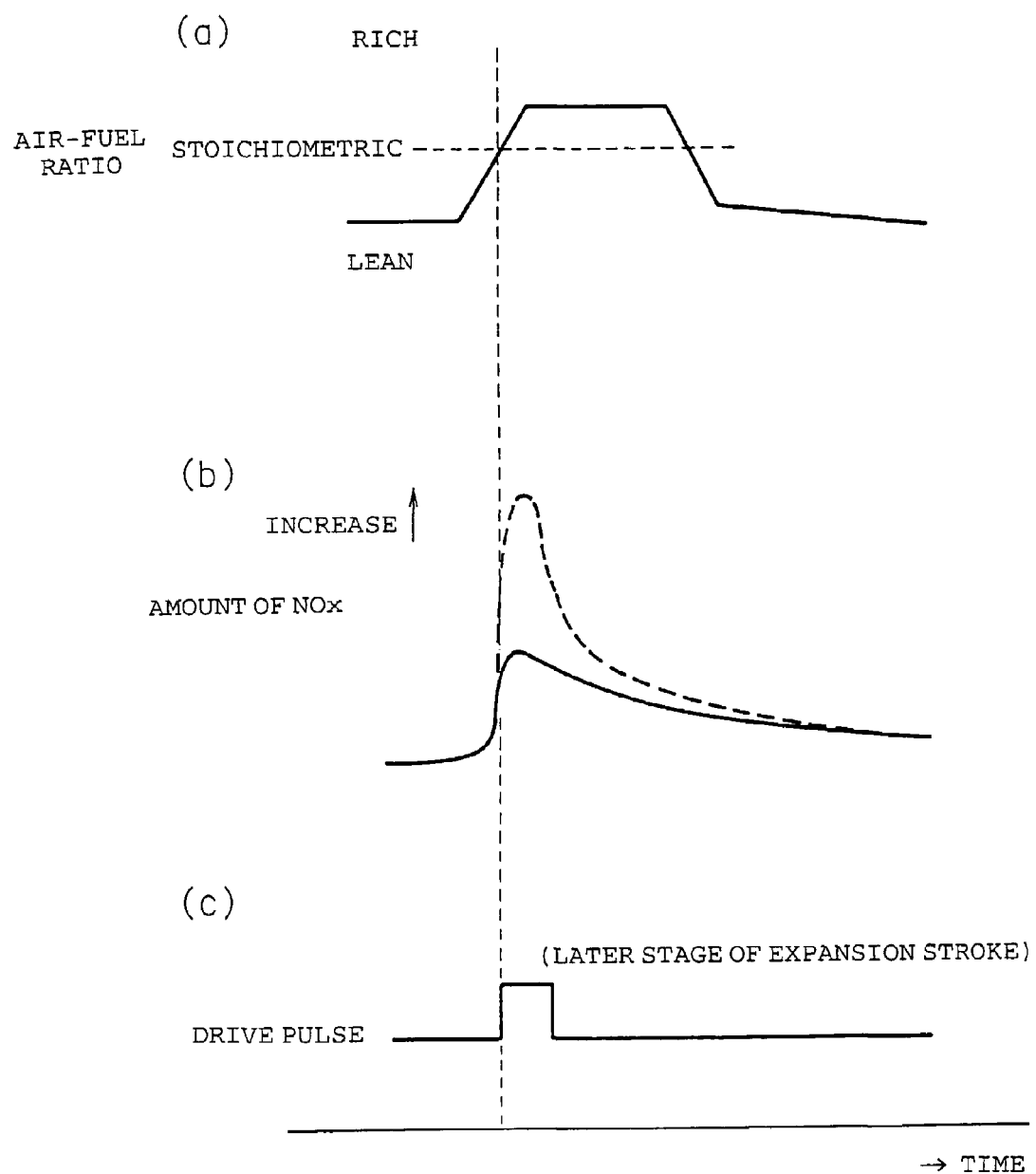
FIG. 3 are graphs representing a basic NOx-releasing behavior.

Specifically, as shown in FIG. 3(*a*), a target air-fuel ratio is gradually shifted to the rich-air-fuel-ratio side so that the exhaust gas assumes the form of a low-oxygen-concentration atmosphere (operation of the NOx-releasing means 32). Upon shifting of a target air-fuel ratio to the rich-air-fuel-ratio side, as represented by a dotted line in FIG. 3, supply of CO begins and the NOx catalyst 15 begins to release NOx according to the properties of noble metals carried thereon immediately after the NOx-releasing means 32 starts a NOx release operation; i.e., at a near stoichiometric air-fuel ratio. Since the amount of reducers (residual CO, HC, etc.) is not sufficient for reducing released NOx, the amount of released NOx becomes greater than that of NOx to be reduced. As a result, an unreduced portion of NOx released from the NOx catalyst 15 is released into the atmosphere.

Thus, in order to additionally supply a reducer for reducing released NOx during regeneration operation by the reducer-supplying means 33, as shown in FIG. 3, a drive pulse is generated to inject additional fuel (pulse injection) through an operation of the fuel injection valve 4, at a near stoichiometric ratio and in addition to the main fuel injection during a compression stroke or intake stroke; specifically, during or after an expansion stroke, preferably during the latter stage of an expansion stroke (or during the initial stage of an exhaust stroke). Pulse injection of such timing is preferred, since such pulse injection does not contribute to combustion and is thus less likely to affect engine output and can supply unburned HC (reducer). The amount of additional fuel to be injected is determined according to the amount of released NOx.

Thus, as represented with a solid line in FIG. 3(*b*), an additionally supplied reducer reduces NOx, thereby suppressing the amount of NOx to be released into the atmosphere. Accordingly, release of NOx and CO into the atmosphere can be suppressed, thereby preventing a problem of the released NOx being emitted into the atmosphere.

Since the basic example is described here, a description for the above-mentioned stoichiometric feedback purge function of the NOx-releasing means 32 is omitted.

Supply of additional fuel for adding a reducer is set during a period between completion of combustion and completion of exhaust. Through supply of the additional fuel during or after an expansion stroke, preferably during the latter stage of an expansion stroke (or during the initial stage of an exhaust stroke) as described above, the volume of the combustion chamber 5 becomes sufficiently large, and an exhaust valve opens immediately after supply of additional fuel to thereby generate a gas flow. Thus, no fuel adheres to the spark plug 3.

Preferably, noble metals to be carried on the NOx catalyst 19 are selected appropriately to minimize the difference between a NOx-releasing rate (the amount of NOx to be released) and a NOx-reducing rate (the amount of NOx to be reduced), thereby reducing the amount of fuel to be additionally injected.

Specific operation of the above-described exhaust purifier will be described in detail with reference to FIGS. 4 to 13. In the present embodiment, a NOx purge is performed in the following manner: a rich purge is performed for a first predetermined period of time; a stoichiometric feedback (S-F/B) purge is performed for a second predetermined period of time; and a pulse injection is combined with the rich purge and S-F/B purge.

Figure 8:
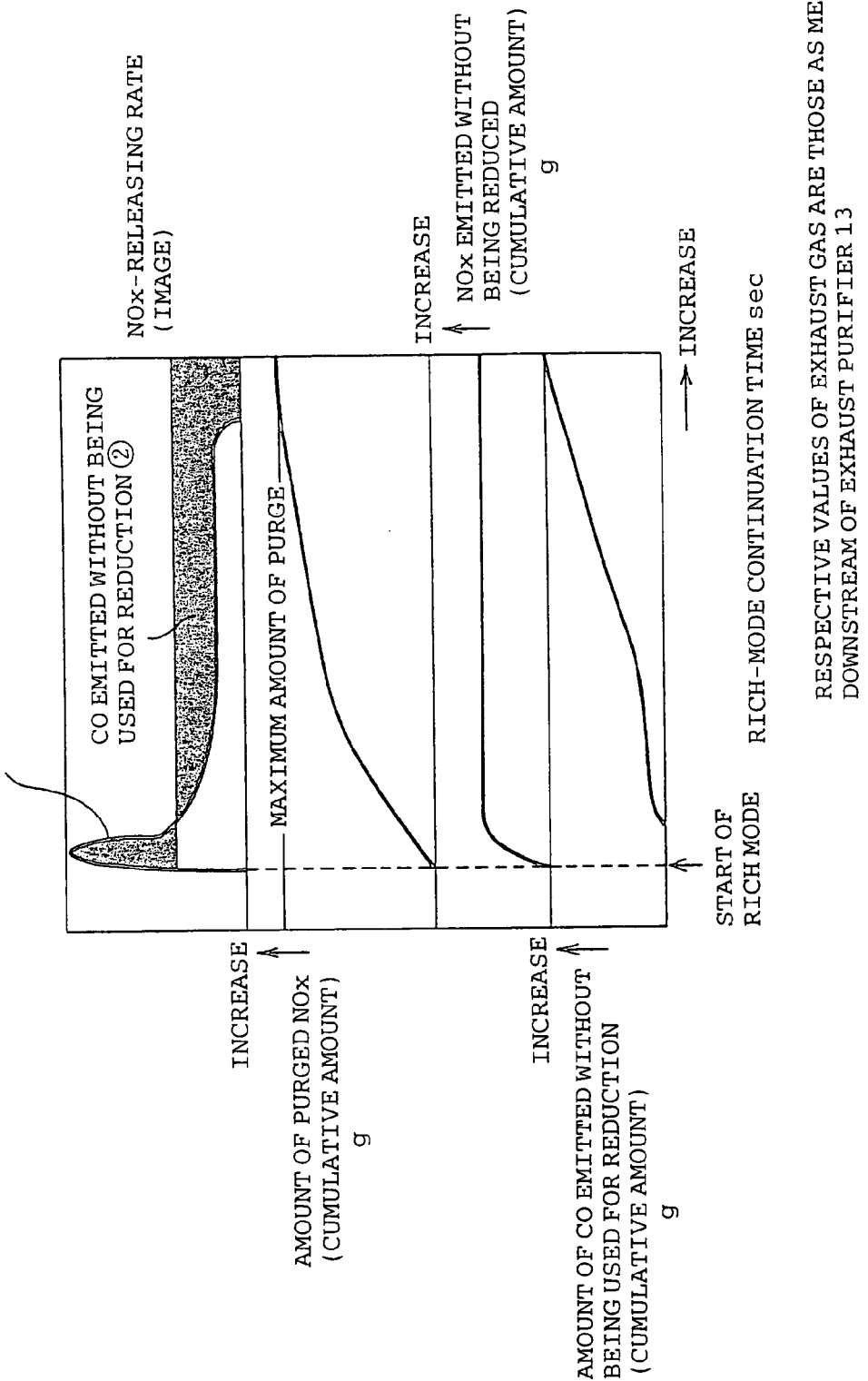
FIG. 8 is a chart showing the relationship during NOx purge between rich-mode continuation time and NOx-releasing rate.
Figure 9:
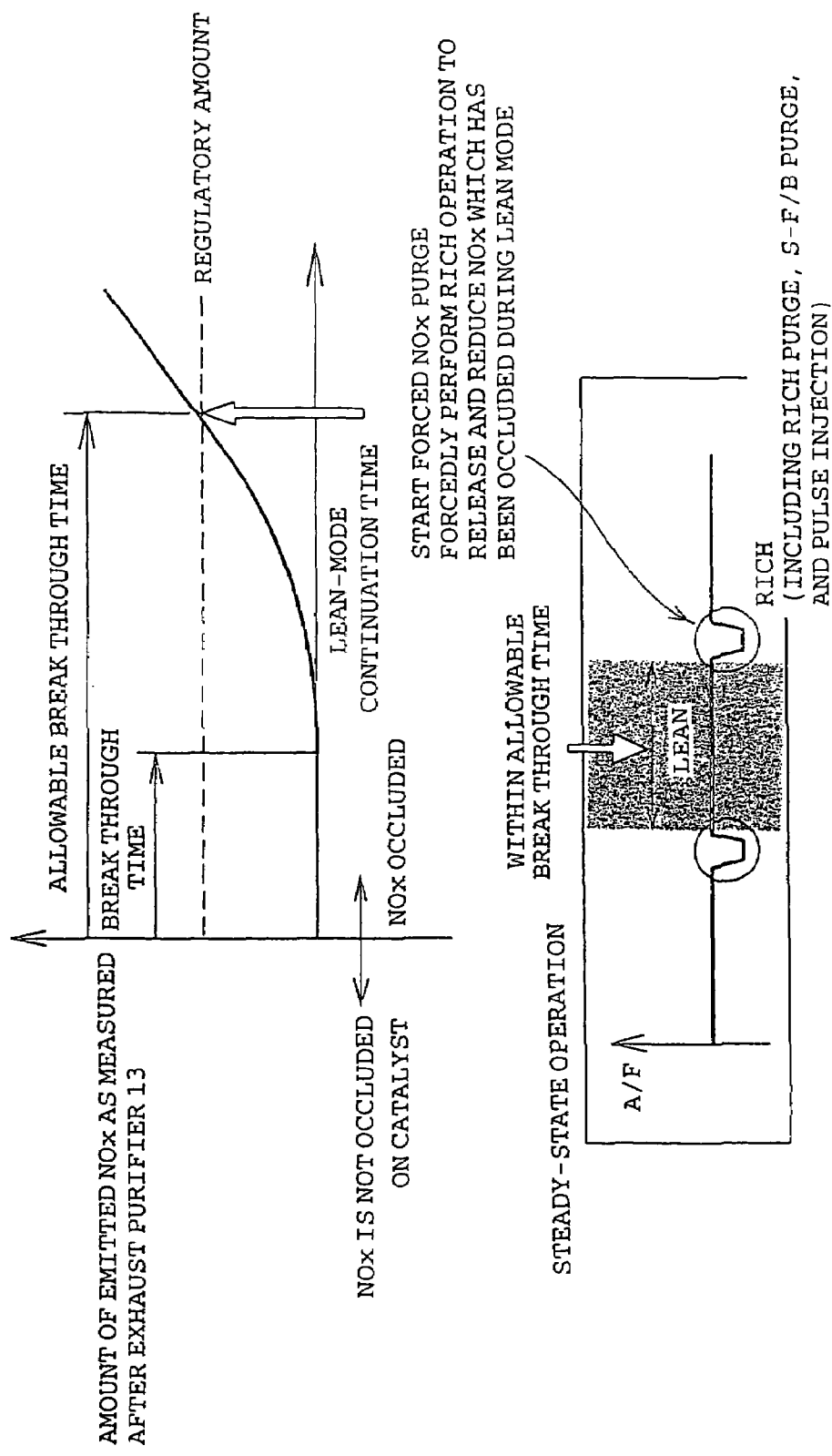
FIG. 9 is a chart showing the relationship between lean-mode continuation time and amount of emitted NOx.

Next will be described the basic idea of NOx release-and-reduction control, which involves a rich purge and a stoichiometric feedback (S-F/B) purge combined with a pulse injection. FIG. 8 shows the effect of a rich-state continuation time on NOx release-and-reduction (NOx purge) performance. An upper portion of FIG. 8 is an imaginary diagram showing a NOx-releasing rate with a rich-mode continuation time during which a NOx purge is performed at a constant rich air-fuel ratio through the supply of CO to the NOx catalyst 15. During the initial stage of a NOx purge after start of a rich mode, the NOx-releasing rate is high, so that a large amount of NOx is released rapidly. Since CO, serving as a reducer, is mainly consumed for releasing NOx, a reducer is in short supply. As a result, a large amount of NOx is emitted without being reduced. Even when a larger amount of CO is supplied, through an increase in the degree of a rich state, in order to supply a reducer for reducing NOx which would otherwise be emitted without being reduced, the amount of NOx released from the NOx catalyst 15 increases accordingly, and thus the NOx-releasing rate increases. Thus, a reducer is in short supply after all. To cope with this problem, additional fuel is injected through a pulse injection to supply unburned fuel; i.e., HC, to the catalyst. Since HC hardly contributes to the release of NOx, supply of HC does not increase the Nox-releasing rate. Accordingly, released NOx can be reduced without involving an increase in the amount of the released NOx. That is, through adjustment of the amount of the pulse injection, the NOx-releasing rate can be balanced with the NOx-reducing rate, thereby suppressing emission of unreduced NOx.

After a certain period of time has elapsed from the start of the rich mode, the NOx-releasing rate decreases. If the constant rich air-fuel ratio is maintained, CO, serving as a reducer, will become excessive, and thus a large amount of CO will be emitted without being used for reduction. Since CO is supplied excessively in a region of a low NOx-releasing rate, the degree of the rich state may be lowered such that a stoichiometric air-fuel ratio or a slightly rich air-fuel ratio is established, to reduce the supply of CO. Thus, emission of CO without use for reduction can be suppressed.

As described above, through combination of a rich purge and an S-F/B purge and further a pulse injection, a NOx purge can be carried out while minimizing emission of relevant exhaust gas components.

According to the present embodiment, in the case of the degree of deterioration of the NOx catalyst 15 having increased, when a rich purge is performed for catalytic regeneration, the NOx-releasing rate is initially high; consequently, a large amount of NOx is transiently released from the NOx catalyst 15. Subsequently, since release of NOx in a region of low NOx-releasing rate (a region in which a NOx purge is performed while a stoichiometric air-fuel ratio or a slightly rich air-fuel ratio is maintained) is time-consuming, the second predetermined period of time, during which an S-F/B purge is performed, is rendered relatively long (correction means). Thus, release of NOx consumes a greater amount of time as compared with the case of a low degree of deterioration of the NOx catalyst 15. However, NOx can be sufficiently reduced while suppressing impairment of fuel economy and release of reducers (unburned HC, CO, etc.) into the atmosphere.

Figure 5:
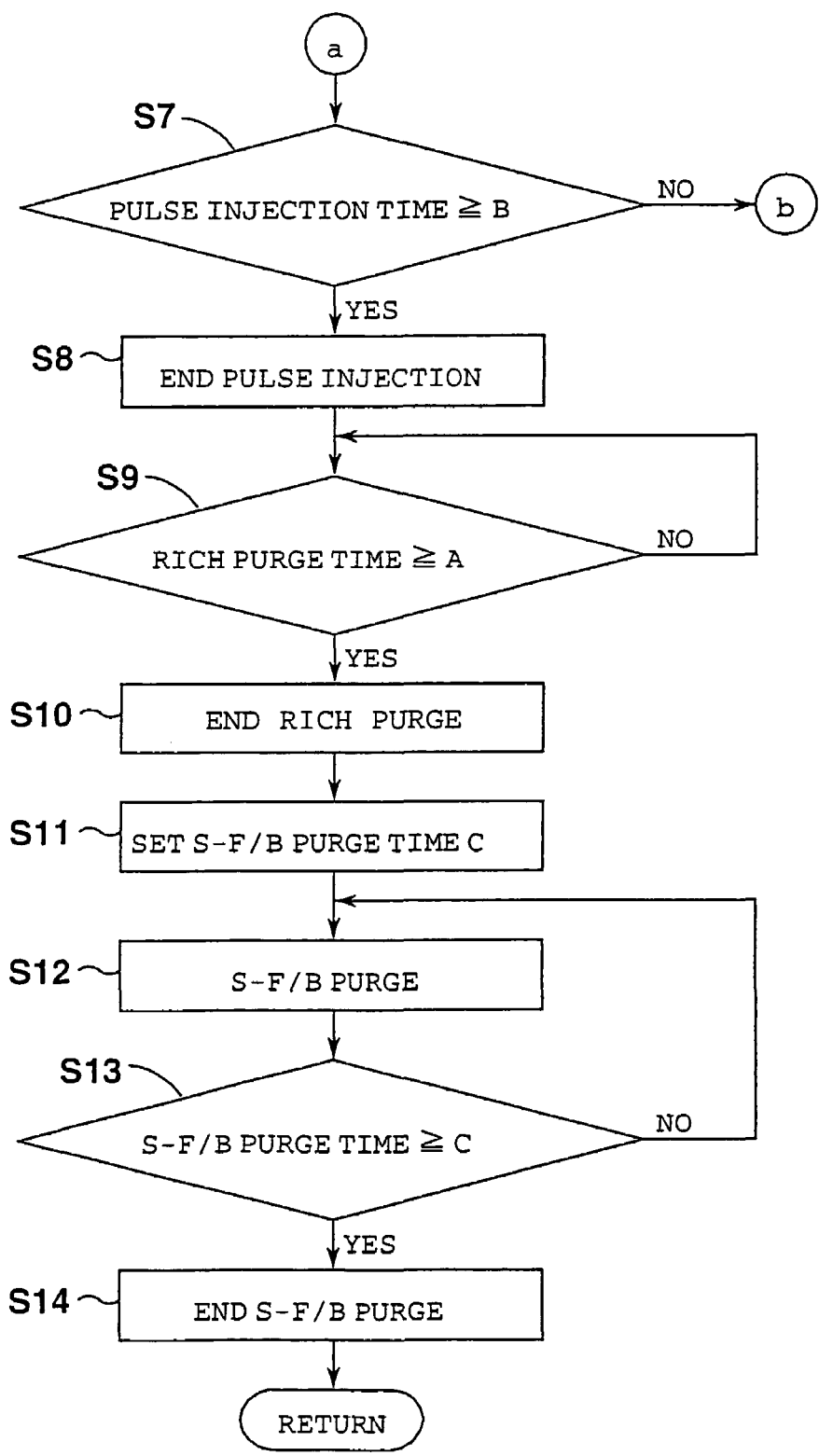
FIG. 5 is a flowchart showing the state of release of NOx effected by the exhaust purifier.
Figure 6:
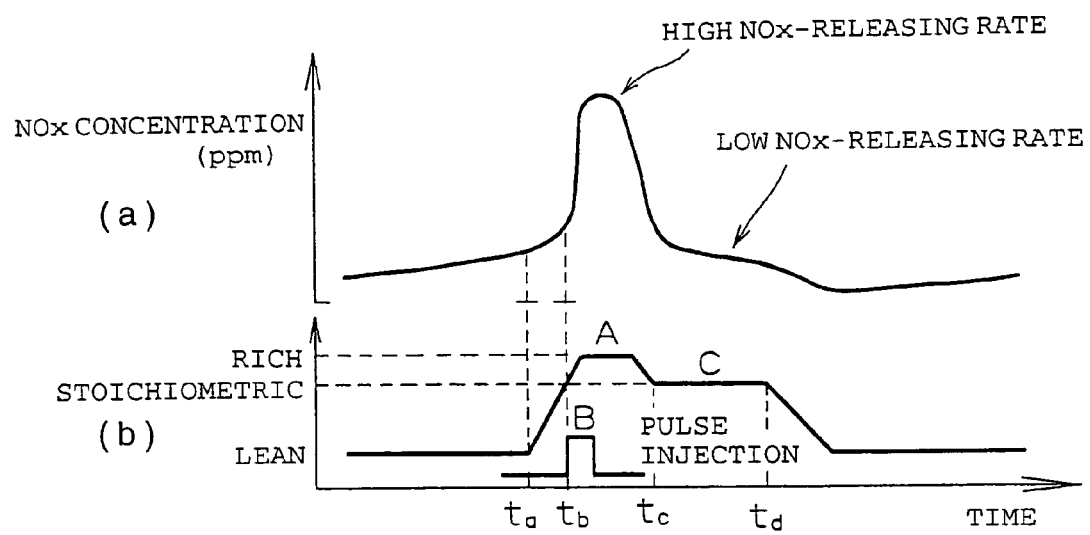
FIG. 6 is a timing chart showing the state of release of NOx.
Figure 7:
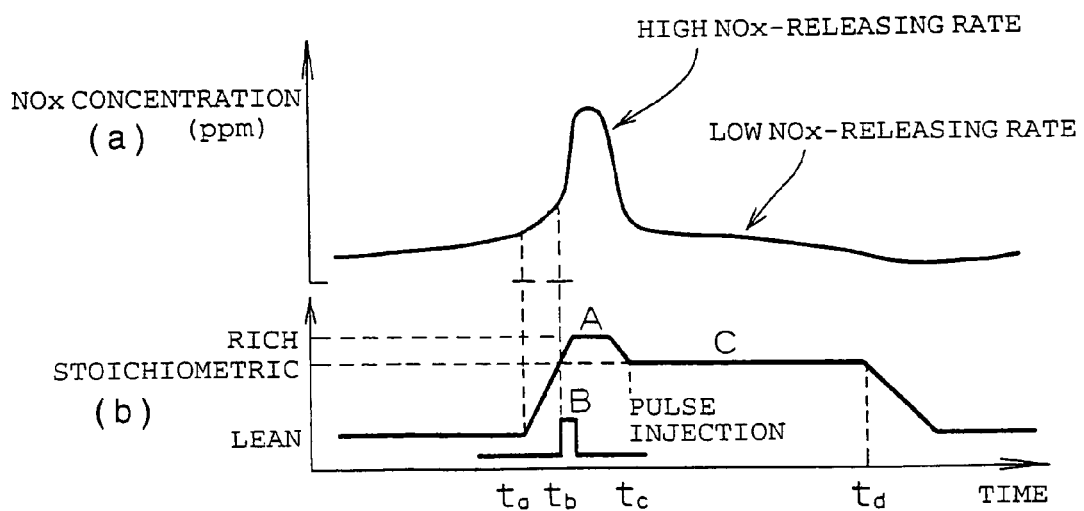
FIG. 7 is a timing chart showing the state of release of NOx.

The above-described NOx release-and-reduction control (NOx purge control) will be described with reference to flowcharts of FIGS. 4 and 5 and timing charts of FIGS. 6 and 7. FIG. 6 shows a state in which the degree of deterioration of the NOx catalyst 15 is low. FIG. 7 shows a state in which the degree of deterioration of the NOx catalyst 15 is high. FIGS. 6(a) and 7(a) show a state of NOx concentration (corresponding to a NOx-releasing rate) as measured downstream of the NOx catalyst 15. FIGS. 6(b) and 7(b) show a state of the air-fuel ratio and a state of a drive pulse of the fuel injection valve 4.

Figure 4:
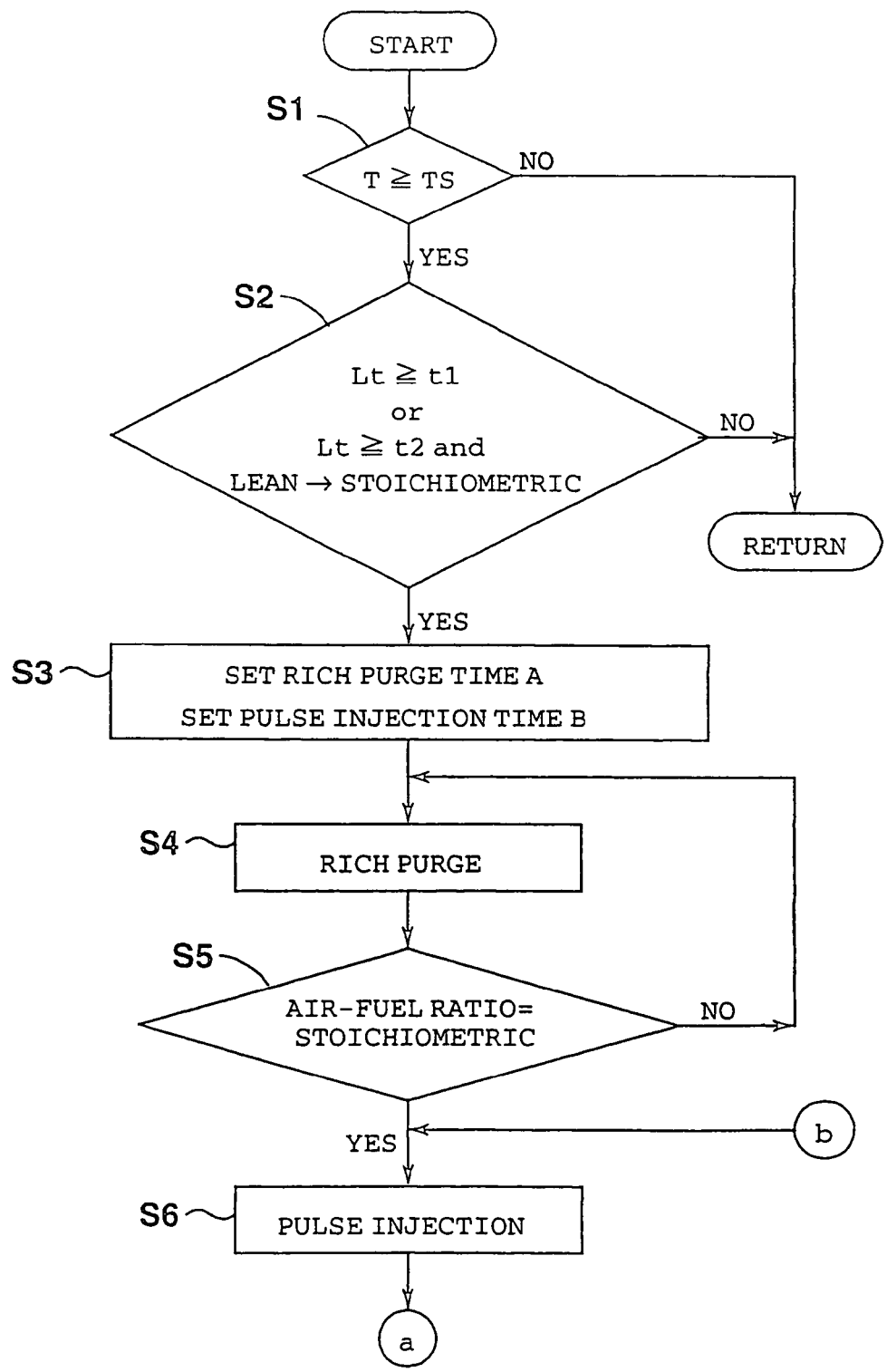
FIG. 4 is a flowchart showing the state of release of NOx effected by the exhaust purifier.

As shown in FIG. 4, in step S1, a judgment is made as to whether or not the temperature T of the three-way catalyst 16 is greater than or equal to Ts (estimation from exhaust temperature as detected by means of the high-temperature sensor 14). When the temperature T of the three-way catalyst 16 is judged to be greater than or equal to Ts (i.e., it is judged that the temperature of the three-way catalyst 16 has reached the activation temperature Ts so that NOx purged from the occludent NOx catalyst 15 can be reduced), control proceeds to step S2. In step S2, a judgment is made as to whether or not the lean-mode continuation time Lt is greater than or equal to the first predetermined period of time t1, or whether or not the lean-mode continuation time Lt is greater than or equal to the second predetermined period of time t2, and also whether or not the lean mode is to be switched to a stoichiometric mode. The first predetermined period of time t1 (lean-mode continuation time) is set to, for example, 30 seconds, by a method which will be described later. The first predetermined period of time t1 serves as a condition of judgment to be employed when operation in the lean mode is performed continuously. The second predetermined period of time t2 is set to, for example, 5 seconds, and serves as a condition of judgment to be employed when an engine is to be accelerated in the lean mode.

A procedure for setting the lean-mode continuation time for use in NOx purge control will be described below.

When lean operation is continued, the NOx catalyst 15 is saturated with occluded NOx, followed by release of NOx into the atmosphere. Allowable breakthrough time is defined as a period of time between start of the lean operation and the time when the amount of released NOx has reached a regulatory amount. NOx purge control must be forcedly performed (forced NOx purge) to avoid performance of lean operation beyond the allowable breakthrough time. Thus, the lean-mode continuation time is desirably not greater than a predetermined value (see FIG. 9).

Figure 10:
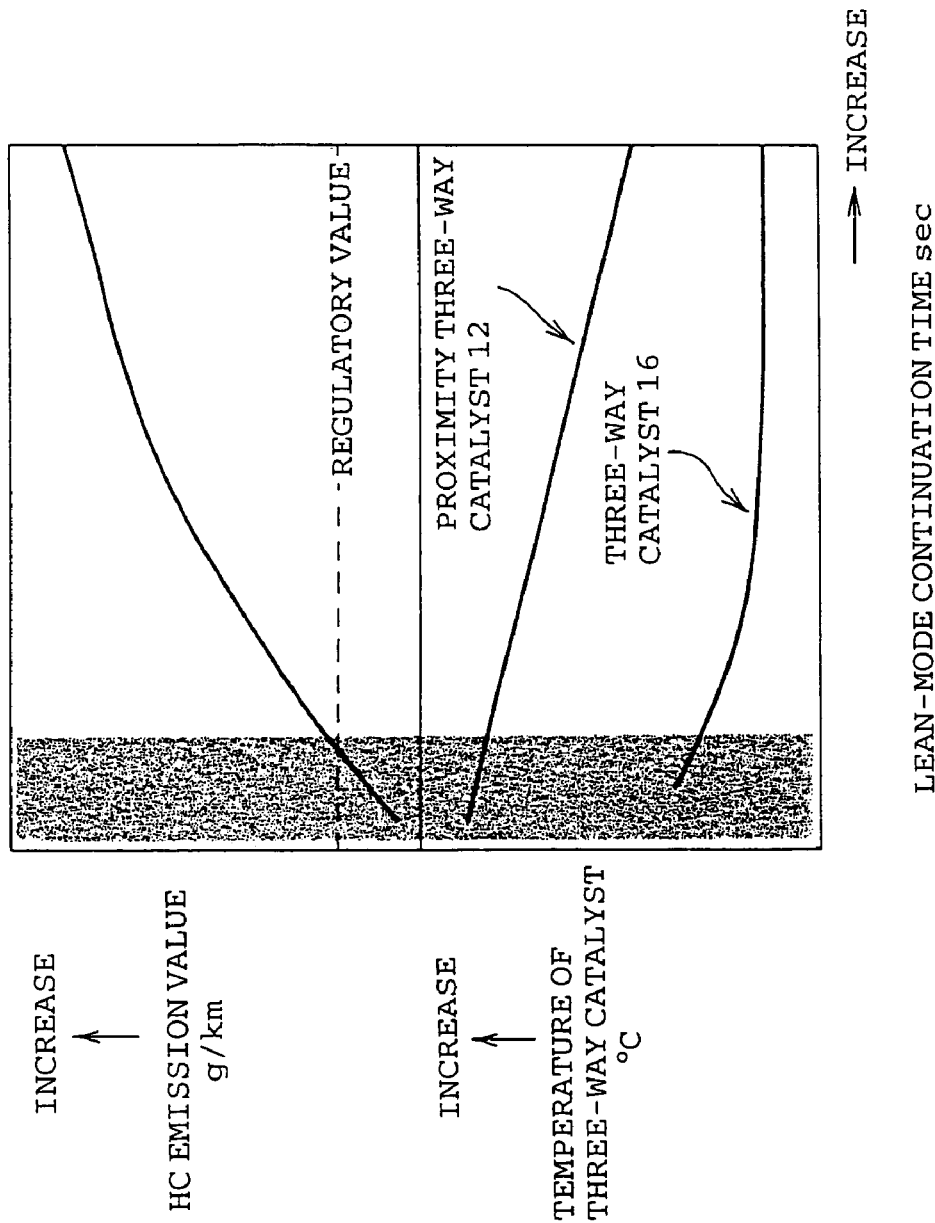
FIG. 10 is a chart showing the relationship between lean-mode continuation time and HC emission value.
Figure 11:
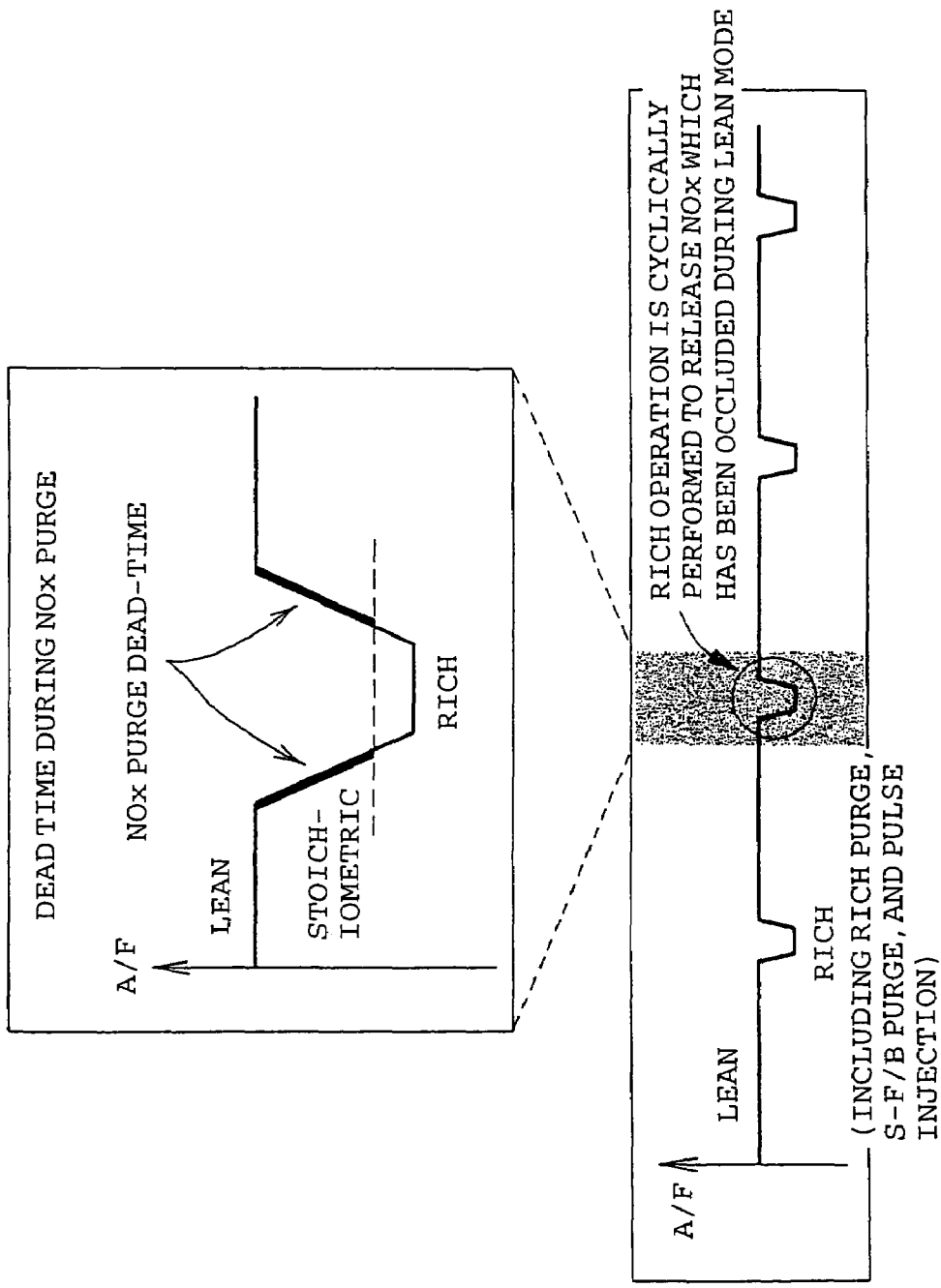
FIG. 11 is a chart showing dead time during NOx purge (during shift to rich state)
Figure 12:
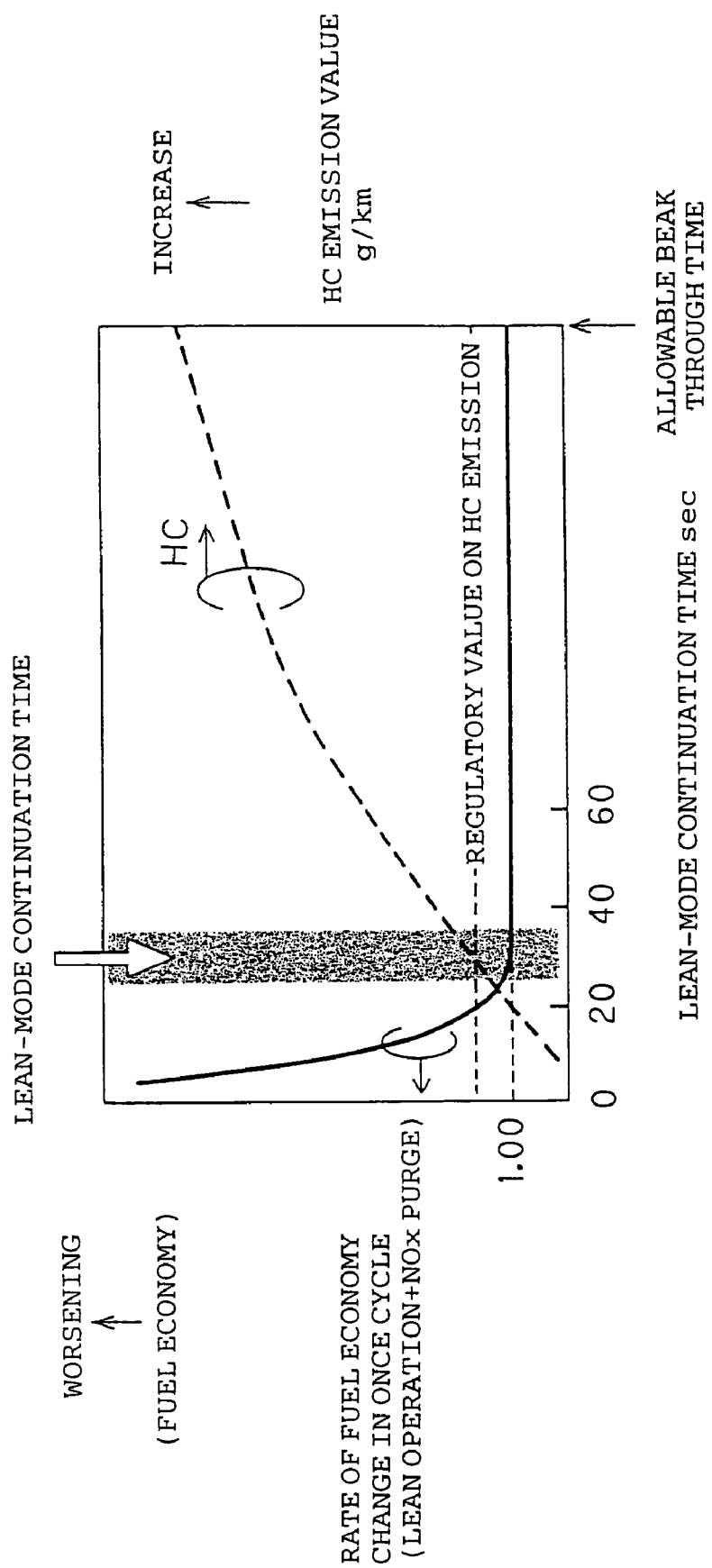
FIG. 12 is a chart explaining optimum lean-mode continuation time.

As shown in FIG. 10, the temperature of the (three-way) catalyst lowers with the lean-mode continuation time. When the temperature of the catalyst lowers, the purification efficiency of the catalyst is impaired, resulting in an increased HC emission value. Thus, the lean-mode continuation time is preferably not greater than a predetermined value.

During the NOx purge, a lean air-fuel ratio is established during a period of time ranging from the lean state to the stoichiometric state (NOx purge dead-time) Therefore, during the NOx purge dead-time, NOx is not released, but fuel economy worsens since the degree of the lean state decreases. Thus, in the case where the frequency of NOx purge increases as a result of lessening of the lean-mode continuation time, the percentage of the NOx purge dead-time in relation to the entire NOx purge time increases, thus worsening fuel economy. Accordingly, the lean-mode continuation time is preferably not greater than a predetermined value (see FIG. 11).

Under the above-described conditions (1) to (3), the optimum lean-mode continuation time can be set. For example, the catalytic capacity, characteristics of the NOx catalyst 15, characteristics of the three-way catalysts, and a regulatory value on emission of HC have a certain effect on the lean-mode continuation time. Generally, as represented by a dotted line in FIG. 12, from the viewpoint of HC emission value as mentioned above in (2), the lean-mode continuation time is preferably not greater than about 40 seconds. As represented by a solid line in FIG. 12, from the viewpoint of fuel economy as mentioned above in (3), the lean-mode continuation time is preferably not less than about 20 seconds. Accordingly, the lean-mode continuation time is 20 seconds to 40 seconds, preferably 30 seconds. In actual operation, since acceleration and deceleration are involved, the steady-state operation (lean operation) is less likely to continue longer than such a lean-mode continuation time, raising no problem in actual use. The lean-mode continuation time may be variable depending on the amount of NOx flowing into the NOx catalyst 15; for example, may be mapped with respect to a vehicle speed. Also, the lean-mode continuation time may assume a substantially constant value.

In step S2, when either condition is established (in the case of YES), indicating establishment of the condition for starting NOx release-and-reduction control (NOx purge) by regenerating means to release occluded NOx from the occludent NOx catalyst 15 and to reduce released NOx, control proceeds to step S3. In step S3, in order to perform a rich purge so that the exhaust gas assumes a rich air-fuel ratio for the first predetermined period of time, a rich purge period of time A (first predetermined period of time) and a pulse injection period of time B are set.

The rich purge period of time A is set on the basis of the product of an exhaust gas flow rate, for example, a mapped value of intake air volume and the degree of deterioration of the NOx catalyst 15, for example, a mapped value of travel distance (deterioration-detecting means). The rich purge period of time A is set to, for example, about 1 second to about 5 seconds. The rich purge period of time A is set in such a manner so as to be shortened to about two-third as travel distance increases; i.e., as the degree of deterioration increases. The rich purge period of time A is shortened for the following reason. As the degree of deterioration of the NOx catalyst 15 increases, NOx release characteristics vary as shown in FIGS. 6(a) and 7(a); specifically, the amount of released NOx decreases in a region of high NOx-releasing rate, and thus NOx release time becomes shorter. Thus, shortening of the rich purge period of time A is intended to suppress worsening of fuel economy and release of unburned HC and CO.

The pulse injection period of time B is set on the basis of the product of an exhaust flow rate, for example, a mapped value of intake air volume and the degree of deterioration of the NOx catalyst 15, for example, a mapped value of travel distance (deterioration-detecting means). The pulse injection period of time B is set to, for example, about 0.1 second to about 1 second. The pulse injection period of time B is set in such a manner so as to be shortened up to about one-half as travel distance increases; i.e., as the degree of deterioration increases. The pulse injection period of time B is shortened for the following reason. As mentioned above, as the degree of deterioration of the NOx catalyst 15 increases, NOx release characteristics vary; specifically, the amount of released NOx decreases in a region of high NOx-releasing rate, and thus a required amount of a reducer is small. Thus, shortening of the pulse injection period of time B is intended to suppress worsening of fuel economy and release of unburned HC.

After the rich purge period of time A and the pulse injection period of time B are set in step S3, control proceeds to step S4. In step S4, a rich purge for rich purge period of time A is initiated (at ta in FIGS. 6 and 7) in order to render the air-fuel ratio rich (e.g., A/F=12). At this time, ignition timing, intake air volume, fuel injection timing, target EGR opening, etc. are controlled appropriately to avoid the occurrence of a stepwise torque change between the lean mode and the rich purge mode. When the lean mode is to be switched to the rich purge mode, tailing of air-fuel ratio is performed to avoid a sharp change in air-fuel ratio, thereby diminishing a torque shock involved in the switching.

In step S5, a judgment is made as to whether or not the air-fuel ratio has become stoichiometric in the process of tailing of air-fuel ratio. When the air-fuel ratio is judged to be stoichiometric (predetermined timing), control proceeds to step S6. In step S6, additional injection of fuel for pulse injection period of time B is initiated (at tb in FIGS. 6 and 7; herein, called pulse injection). In the process of tailing of air-fuel ratio, when the air-fuel ratio passes a stoichiometric region and begins to enter a rich region, the CO concentration of the exhaust gas increases rapidly, and the occluded NOx is released rapidly in a large amount from the occludent NOx catalyst 15 (see FIGS. 6(a) and 7(a)). As a result, the amount of CO or HC serving as a reducer becomes insufficient.

Thus, a pulse injection is performed at the timing of the air-fuel ratio becoming stoichiometric to thereby add a reducer. Preferably, the pulse injection is performed at a point of time between the intermediate stage of an expansion stroke and the initial stage of an exhaust stroke, particularly during the latter stage of an expansion stroke. Through the additional injection of fuel during the latter stage of an expansion stroke, unburned fuel (reducer) is supplied into the exhaust path and is used for reducing NOx released from the catalyst. Injection of fuel during an expansion stroke or during an exhaust stroke is less likely to have an effect on the output of the cylinder-injection engine 1.

As mentioned above, the pulse injection is initiated at the timing of the air-fuel ratio becoming stoichiometric. If the pulse injection is initiated too early, since NOx is not much released from the NOx catalyst 15, injected unburned fuel (reducer) will not be not used for reduction of NOx, but is released into the atmosphere, causing an increase in HC emission. By contrast, if the pulse injection is initiated too late, the amount of a reducer will become insufficient for reducing released NOx which is increasing rapidly, causing an increase in NOx emission.

After the pulse injection is performed in step S6, control proceeds to step S7. In step S7, as shown in FIG. 5, a judgment is made as to whether or not the pulse injection period of time is greater than or equal to B. When the pulse injection period of time is judged to be less than B, control returns to step S6, and pulse injection is continued. When the pulse injection time is judged to be greater than or equal to B, control proceeds to step S8, where the pulse injection is ended. Subsequently, in step S9, a judgment is made as to whether or not the rich purge period of time is greater than or equal to A. When the rich purge period of time is judged to be greater than or equal to A, control proceeds to step S10, where the rich purge is ended.

After the rich purge is ended, in order to perform an S-F/B purge to establish a stoichiometric air-fuel ratio in the exhaust, in step 511, S-F/B purge period of time C (second predetermined period of time) is set. The S-F/B purge may be performed to establish in the exhaust gas a near stoichiometric air-fuel ratio; i.e., an air-fuel ratio slightly richer than a stoichiometric air-fuel ratio.

S-F/B purge period of time C is set on the basis of the product of the following three values: the last lean-mode continuation time; an exhaust flow rate, for example, a mapped value of intake air volume; and the degree of deterioration of the NOx catalyst 15, for example, a mapped value of travel distance (deterioration-detecting means). The S-F/B purge period of time C is set to, for example, 0% to 50% lean-mode continuation time. The S-F/B purge period of time C is set in such a manner that the S-F/B purge period of time C lengthens (% increases) with travel distance or with the degree of deterioration. Specifically, a mapped value of intake air volume is set such that the S-F/B purge period of time C becomes 10% to 30% lean-mode continuation time. The thus-set S-F/B purge period of time C is varied between 0 time and about 1.5 times according to travel distance (according to deterioration).

The S-F/B purge period of time C is lengthened with the degree of deterioration of the NOx catalyst 15 for the following reason. As shown in FIGS. 6($a$) and 7($a$), as the degree of deterioration of the NOx catalyst 15 increases, releasing of NOx consumes more time in a region of low NOx-releasing rate. Specifically, as deterioration of the NOx catalyst 15 progresses, NOx release time becomes shorter in a region of high Nox-releasing rate and becomes longer in a region of low NOx-releasing rate. Accordingly, through prolongation of the S-F/B purge period of time C, a reducer is supplied for a longer period of time than in the case of a low degree of deterioration. As a result, even though releasing of NOx consumes time, NOx can be sufficiently released and reduced.

After the S-F/B purge period of time C is set in step 511, control proceeds to step S12. In step S12, an S-F/B purge is performed for the S-F/B purge period of time C (between tc and td in FIGS. 6 and 7). At this time, ignition timing, intake air volume, fuel injection timing, target EGR opening, etc. are controlled appropriately to avoid the occurrence of a stepwise torque change between the rich purge mode and the S-F/B purge mode. When the rich purge mode is to be switched to the S-F/B purge mode, to avoid a sharp change in the air-fuel ratio, thereby diminishing a torque shock involved in the switching. In the case of the S-F/B purge being performed in a slight rich state, an integral-correction gain for use in stoichiometric feedback control may be set such that a gain for shifting to the rich state is greater than that for shifting to the lean state.

The above-described exhaust purifier functions in the following manner. When occluded NOx is to be released from the NOx catalyst 15 and to be reduced, a rich purge is performed for the first predetermined period of time, and subsequently an S-F/B purge is performed for the second predetermined period of time. In the case of the degree of deterioration of the NOx catalyst 15 having increased, the second predetermined period of time, during which the S-F/B purge is performed, is lengthened. In the case of the degree of deterioration of the NOx catalyst 15 having increased, when a rich purge is performed for catalytic regeneration, the NOx-releasing rate is initially high; consequently, a large amount of NOx is abruptly released from the NOx catalyst 15 in a transient manner. Subsequently, even though release of NOx in a region of low NOx-releasing rate becomes time-consuming, a reducer is supplied for a longer period of time as compared to the case of a low degree of deterioration of the NOx catalyst 15. Further, in the case of the degree of deterioration of the NOx catalyst 15 having increased, time required for releasing NOx in a region of high NOx-releasing rate becomes shorter. Therefore, the first predetermined period of time, during which the rich purge is performed, and the pulse injection period of time are shortened. Thus, NOx is sufficiently released and reduced while suppressing impairment of fuel economy and the amount of unburned HC and CO to be released into the atmosphere, thereby reliably suppressing the amount of NOx to be released into the atmosphere.

After the S-F/B purge is performed in step S12, control proceeds to step S13. In step S13, a judgment is made as to whether or not the S-F/B purge period of time is greater than or equal to C. When the S-F/B purge period of time is judged to be less than C, control returns to step S12, and the S-F/B purge is continued. When the S-F/B purge period of time is judged to be greater than or equal to C, control proceeds to step S14, where the S-F/B purge is ended.

Figure 13:
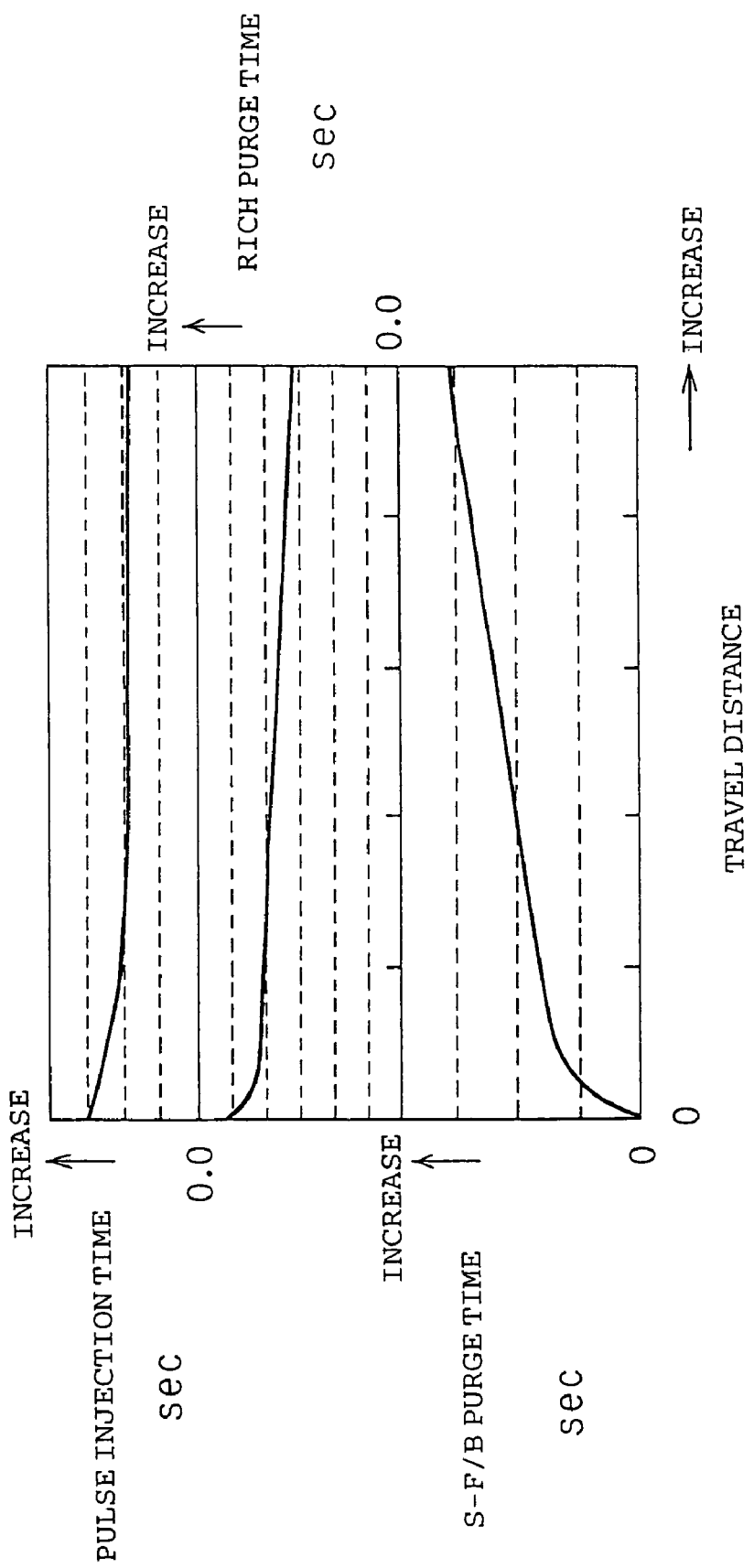
FIG. 13 is a chart showing the effect of catalyst deterioration on NOx-releasing rate.

FIG. 13 shows the effect of catalyst deterioration on the NOx-releasing rate; specifically, the S-F/B purge period of time, rich purge period of time, and pulse injection period of time in the case where emission of relevant exhaust gas components during NOx purge is minimized. As also seen from FIG. 13, the S-F/B purge period of time must be lengthened with the degree of catalyst deterioration, indicating an increase in a portion of low NOx-releasing rate. By contrast, the rich purge period of time and the pulse injection period of time must be shortened, indicating a decrease in a portion of high NOx-releasing rate.

The above-described exhaust purifier functions in the following manner. When occluded NOx is to be released from the NOx catalyst 15 and to be reduced, a rich purge is performed for the first predetermined period of time, and subsequently an S-F/B purge is performed for the second predetermined period of time. In the case of the degree of deterioration of the NOx catalyst 15 having increased, the second predetermined period of time, during which the S-F/B purge is performed, is lengthened. In the case of the degree of deterioration of the NOx catalyst 15 having increased, when a rich purge is performed for catalytic regeneration, the NOx-releasing rate is initially high; consequently, a large amount of NOx is abruptly released from the NOx catalyst 15 in a transient manner. Subsequently, even though release of NOx in a region of low NOx-releasing rate becomes time-consuming, a reducer is supplied for a longer period of time as compared to the case of a low degree of deterioration of the NOx catalyst 15. Further, in the case of the degree of deterioration of the NOx catalyst 15 having increased, time required for releasing NOx in a region of high NOx-releasing rate becomes shorter. Therefore, the first predetermined period of time, during which the rich purge is performed, and the pulse injection period of time are shortened. Thus, NOx is sufficiently released and reduced while suppressing impairment of fuel economy and the amount of unburned HC and CO to be released into the atmosphere, thereby reliably suppressing the amount of NOx to be released into the atmosphere.

According to the above-described embodiment, a judgment is made in step S2 as to whether or not the lean mode must be switched to the stoichiometric mode. Thus, even at the time of acceleration, rich purge, S-F/B purge, and pulse injection are performed. However, at the time of acceleration, since fuel injection is increased, the rich state is established, followed by stoichiometric operation. Thus, only the pulse injection may be performed. Further, in this case, the pulse injection period of time may be variable depending on the degree of increase in fuel injection for acceleration or the lean-mode continuation time. At a point of time when a stoichiometric air-fuel ratio is reached, the pulse injection may be started.

According to the above-described embodiment, switching of the lean mode to the rich purge mode is gradually performed. When the stoichiometric state is established during the air-fuel ratio being tailed from the lean state to the rich state, the pulse injection is started. However, when the lean mode is instantaneously switched to the rich purge mode; i.e., when tailing of the air-fuel ratio is not performed, the pulse injection may be started simultaneously with the switching.

According to the above-described embodiment, the three-way catalyst 16 is disposed downstream of the NOx catalyst 15. NOx released from the NOx catalyst 15 is reduced not only on the NOx catalyst 15 but also on the three-way catalyst 16. However, there may be employed the NOx catalyst 15 assuming the form of an integral, occludent three-way NOx catalyst having a sufficient NOx-reducing (three-way catalyst) function. In this case, the pulse injection is performed over a very short period of time, or may be omitted.

Further, according to the above-described embodiment, the exhaust purifier is applied to a spark ignition engine, in which fuel is injected directly into a combustion chamber. However, the present invention may be applied to a diesel engine or a spark-ignition lean-burn engine, in which fuel is injected into a suction pipe and the thus-formed mixture is introduced into a combustion chamber, as long as the occludent NOx catalyst 15 is employed for release and reduction of NOx. When the present invention is applied to an engine in which mixture is introduced into a combustion chamber, the reducer-supplying means may be adapted to inject additional fuel serving as an additional reducer into an exhaust path.

Even when the NOx catalyst 15 (catalyst device) is deteriorated, the above-described exhaust purifier for use in an internal combustion engine can reliably reduce NOx emission while suppressing worsening of fuel economy and release of unburned HC and CO during regeneration of the NOx catalyst 15.

Since NOx released from the NOx catalyst device is reduced by means of an added reducer, the internal combustion engine of the present invention does not encounter a problem in which released NOx is emitted into the atmosphere, thereby suppressing worsening of exhaust gas performance.

What is claimed is:

1. An exhaust gas purifier for an internal combustion engine, comprising:
   a NOx catalyst device disposed in an exhaust path of the engine, and occluding NOx contained in an exhaust gas when an air-fuel ratio in the exhaust gas is lean and releasing occluded NOx when the air-fuel ratio in the exhaust gas is stoichiometric or rich; and
   reducer-supplying means for supplying a reducer for reducing NOx released from said NOx catalyst device when an actual air-fuel ratio in the exhaust gas substantially becomes a stoichiometric air-fuel ratio after an operating mode of the internal combustion engine is switched from a lean air-fuel ratio mode to a stoichiometric air-fuel ratio mode or a rich air-fuel ratio mode.

2. The exhaust gas purifier for an internal combustion engine according to claim 1, wherein the reducer-supplying means operates when CO is supplied to said NOx catalyst device as a result of switching the air-fuel ratio in the exhaust gas from the lean air-fuel ratio to at least one of the stoichiometric air-fuel ratio and the rich air-fuel ratio.

3. The exhaust gas purifier for an internal combustion engine according to claim 1, wherein the engine includes an injection valve for injecting a main fuel directly into a combustion chamber of the internal combustion engine, and said reducer-supplying means supplies the reducer by operating the injection valve.

4. The exhaust gas purifier for an internal combustion engine according to claim 3, wherein said reducer-supplying means injects a secondary fuel during one of an expansion stroke and an exhaust stroke subsequent to injection of said main fuel effected by the injection valve.

5. An exhaust purifier for use in an internal combustion engine, comprising:
   a NOx catalyst disposed in an exhaust path of the engine and adapted to occlude NOx contained in an exhaust gas when the exhaust gas is in an oxygen-excessive atmosphere and adapted to release occluded NOx when the exhaust gas is in a low-oxygen-concentration atmosphere;
   NOx-releasing means for causing said NOx catalyst to release NOx through establishment of the low-oxygen-concentration atmosphere of the exhaust gas; and
   reducer-supplying means for additionally supplying a reducer for reducing NOx into the exhaust path at predetermined timing during operation of said Nox-releasing means,
   wherein said reducer-supplying means operates when the air-fuel ratio in the exhaust gas becomes closer to a stoichiometric air-fuel ratio.

6. The exhaust gas purifier for an internal combustion engine according to claim 5, wherein the reducer-supplying means operates when CO is supplied to said NOx catalyst device by said NOx-releasing means.

7. The exhaust gas purifier for an internal combustion engine according to claim 5, wherein the engine includes an injection valve for injecting a main fuel directly into a combustion chamber of the internal combustion engine, and said reducer-supplying means supplies the reducer by operating the injection valve.

8. The exhaust gas purifier for an internal combustion engine according to claim 5, wherein said reducer-supplying means injects a secondary fuel during one of an expansion stroke and an exhaust stroke subsequent to injection of said main fuel effected by the injection valve.

9. The exhaust gas purifier for an internal combustion engine according to claim 5, wherein the NOx-releasing means maintains the establishment of the low-oxygen-concentration atmosphere of the exhaust gas for a first predetermined period of time determined based on at least one of an exhaust gas flow rate, an intake air volume and a degree of deterioration of the Nox catalyst, or a traveled distance.

10. The exhaust gas purifier for an internal combustion engine according to claim 9, wherein the reducer-supplying means supplies that reducer for a second predetermined period of time, shorter than the first predetermined period of time, determined based on at least one of an exhaust flow rate, an intake air volume and a degree of deterioration of the Nox catalyst, or a traveled distance.

11. The exhaust gas purifier for an internal combustion engine according to claim 9, further comprising:
a stoichiometric feedback purge period determining unit for controlling the air-fuel ratio at the stoichiometric air-fuel ratio for a third predetermined period of time after the first predetermined period has elapsed, said third predetermined period of time being determined based on a last lean-mode continuation time, an exhaust flow rate, and a degree of deterioration of the NOx catalyst.

* * * * *